United States Patent
Clarke

[11] Patent Number: 5,897,191
[45] Date of Patent: Apr. 27, 1999

[54] COLOR INTERLACED IMAGE PROJECTION APPARATUS

[75] Inventor: John A. Clarke, Carshalton, United Kingdom

[73] Assignee: U.S. Philips Corporation, New York, N.Y.

[21] Appl. No.: 08/914,053

[22] Filed: Jul. 15, 1997

[30] Foreign Application Priority Data

Jul. 16, 1996 [GB] United Kingdom ................ 96114887

[51] Int. Cl.⁶ .................................................. G03B 21/14
[52] U.S. Cl. .............................. 353/31; 353/20; 353/122; 348/767; 359/495
[58] Field of Search ................................ 353/31, 38, 122, 353/20; 349/5; 348/752, 762, 767, 793; 359/495

[56] References Cited

U.S. PATENT DOCUMENTS

| | | | |
|---|---|---|---|
| 5,098,184 | 3/1992 | Van Den Brandt et al. | 353/102 |
| 5,184,248 | 2/1993 | De Vaan et al. | 359/483 |
| 5,537,256 | 7/1996 | Fergason | 348/767 |
| 5,601,351 | 2/1997 | Van Den Brandt | 353/20 |
| 5,612,797 | 3/1997 | Clarke | 349/5 |
| 5,626,408 | 5/1997 | Heynderickx et al. | 353/20 |
| 5,626,411 | 5/1997 | Takahasshi et al. | 353/69 |
| 5,727,860 | 3/1998 | Broer et al. | 353/20 |

*Primary Examiner*—William Dowling
*Attorney, Agent, or Firm*—Walter M. Egbert, III

[57] ABSTRACT

A color image projection apparatus comprising a plurality of (LC) image display panels (33), each operating with light of a different color (R,G,B), whose outputs are combined by combining means (24, 25) and projected via a lens (28) onto a screen (32) and electro-optical deflection means, comprising a birefringent element (40) following the combining means and preceded by polarization switch means (42) operable to displace slightly the outputs from rows of pixels in each of the panels in either the odd or even fields so as to produce an interlaced image on the screen. Considerably improved performance is achieved by providing a respective, separate, polarization switch element between each display panel (33) and the combining means (24, 25), and preferably closely adjacent to the output side of the display panel.

6 Claims, 3 Drawing Sheets

COLOR INTERLACED IMAGE PROJECTION APPARATUS

BACKGROUND OF THE INVENTION

The present invention relates to a colour image projection apparatus comprising illumination means, image display means comprising a plurality of image display panels each illuminated with a different colour light and each having an array of pixels arranged in rows and columns and operable to produce a display output, means for combining the display outputs from the plurality of display panels, a projection lens for projecting the combined outputs on to a projection screen to produce an image, and electro-optical deflection means which is switchable between two modes in which for each panel the light rays from a row of pixels of the display panel and passing through the deflection means are shifted relative to one another so as to displace the projected image of the row of pixels on the projection screen, and which electro-optical deflection means comprises a birefringent element which follows the combining means and segmented polarisation switch means which precedes the birefringent element.

Such apparatus may be used for large area display of a broadcast video programme, or an image signal from a storage medium, for example an optical disc or a computer medium. The image display panels used in such apparatus may be matrix LCD panels consisting of a layer of liquid crystal material sandwiched between two substrates and preceded by a polarizer and succeeded by an analyser. The panels comprise a large number of pixels, i.e. individual picture elements, arranged in rows and columns and addressed by a system of row and column electrodes carried on one or both of the substrates through which drive signals are supplied to the pixels. The matrix LCD panel may be of the active type in which each individual pixel is provided with a switching device, typically a thin film transistor (TFT) or a thin film diode (TFD). For a full colour projection display then the apparatus, as with known LC projection apparatus, may have three image display panels each of which is illuminated with light of a respective primary colour, red, green and blue, which may be obtained by splitting the output from a white light source into its primary colour components, with each panel modulating its respective colour light component according to supplied display information, e.g. a video signal, and the modulated outputs being combined and projected onto the screen to produce a full colour image.

In conventional projection apparatus, the number of pixel rows in the image display panels should correspond to the number of image lines in the supplied video signal to ensure that all image information is utilised in producing the viewed display. In a standard TV signal each frame consists of two interlaced fields transmitted sequentially, each comprising half the total number of display lines. The information for all the odd numbered lines is transmitted and then the information for all the even numbered lines. In a matrix LC display panel the pixel rows each display the information of a video line and all pixel rows, odd and even, are continuously illuminated so light passes through the pixels in the even rows during the time when only odd rows information is available, and vice versa. Because each pixel of the panel passes light at each moment, old image information is interwoven between the most recent image information which leads to display artefacts in a picture with fast moving parts. Various ways have been devised to mitigate the artefacts. For example, during each field period when new information is provided for only half of the pixel rows, the adjacent rows may be provided with the same information. However, this results in a decrease of picture contrast and resolution.

A liquid crystal video projector is disclosed in the paper entitled "A practical wobbling device using Ferro-Electric Liquid Crystals for realising high resolution projectors"by A. Yasuda et al in: "Asia Display 1995", pages 79–82, wherein the odd field of a picture frame is displayed by the same pixel rows as the even field. To that end the projector includes a so-called wobbling device serving as an electro-optic deflection means. This device consists of a segmented polarisation switch and a birefringent plate. The polarisation switch, comprising a ferro-electric liquid crystal panel, is drivable to rotate the plane of polarisation of the light from the display panel through ninety degrees and the birefringent plate changes the propagating direction of the light rays depending on the orientation of the plane of polarisation. The segments of the polarisation switch are operated in sequence such that the plane of polarisation of light from the display panel passing through each segment, corresponding to a group of pixels rows, is switched in turn. The driving of the wobbling device is synchronised with an interlaced image signal, which contains two fields for each picture frame and, for example 25 or 30 frames per second, supplied to the display panel. The picture lines in the projected display corresponding to the second field are shifted to the areas between the pixel rows, producing interlaced images, and the number of displayed horizontal lines appears to be doubled. In this way, to display a standard TV-signal, NTSC or PAL, a display panel can be used that has a number of pixel rows half that of a conventional display. On the other hand a High Definition picture, with for example 1148 horizontal lines, can be displayed by a panel having only 574 pixel rows and originally intended for displaying a standard TV signal. With such a projection apparatus even numbered lines are not displayed when only the odd-numbered line information is available, and vice versa. In a colour projection arrangement described in this paper, the electro-optical deflection means, comprising the polarisation switch and the birefringent plate, is arranged between the optical combining means, in the form of a dichroic prism, for combining the outputs from the three LC panels into a single beam and the projection lens.

SUMMARY OF THE INVENTION

It is an object of the present invention to provide an improved colour image projection apparatus using such an interlace technique.

According to the present invention, an image projection apparatus of the kind described in the opening paragraph is characterised in that the polarisation switch means comprises a respective segmented polarisation switch element situated between each display panel and the combining means. With such an arrangement much improved performance is obtained compared with the known arrangement in which both the polarisation switch means and the birefringent element of the deflection means are disposed adjacent one another between the combining means and the projection lens. The invention stems from a realisation that the light passing through the image display panels will be diverging to some extent and that in the known arrangement light output from a row of pixels in a panel will, due to the divergence of light emanating from the panel and after passing through the optical combining means, reach many of the segments of the polarisation switch means. Consequently, this output from a row of pixels will comprise a mixture of both types of polarisation when it reaches the birefringent element and thus some will be displaced when it is not supposed to be displaced, and vice versa, for a substantial portion of a field period. This results in a confused projected picture with a general loss of resolution and contrast. With respective individual, polarisation switch elements arranged between the display panels and the combining means, in effect moving the polarisation switch means closer to the panels, the extent of this problem is reduced and pictures with considerably improved resolution in contrast are achieved.

Preferably, the polarisation switch elements are positioned closely adjacent to the output side of their respective display panels. The closer each polarisation switch element is to its display panel then the more the picture quality will likely be improved. In a particularly preferred embodiment, each display panel and its respective polarisation switch element are mounted together to form a single unit, for example by bonding, which also serves to simplify mounting and assembly of the components of the apparatus.

Each polarisation switch element preferably comprises a segmented liquid crystal device. Whilst the invention requires a plurality of polarisation switch elements rather than one, common, polarisation switch element as in the known arrangement, this does not add unduly to the complexity or expense of the apparatus. A single, common, birefringent element is still utilised which, in the case of the element comprising a quartz crystal plate as in the known arrangement, is the more expensive component of the deflection means.

BRIEF DESCRIPTION OF THE DRAWINGS

A colour image projection apparatus in accordance with the present invention will now be described, by way of example, with reference to the accompanying drawings, in which.

It will be appreciated that the Figures are merely schematic and are not drawn to scale. The same reference numerals are used throughout the Figures to denote the same or similar parts.

DESCRIPTION OF THE PREFERRED EMBODIMENTS

Figure 1:
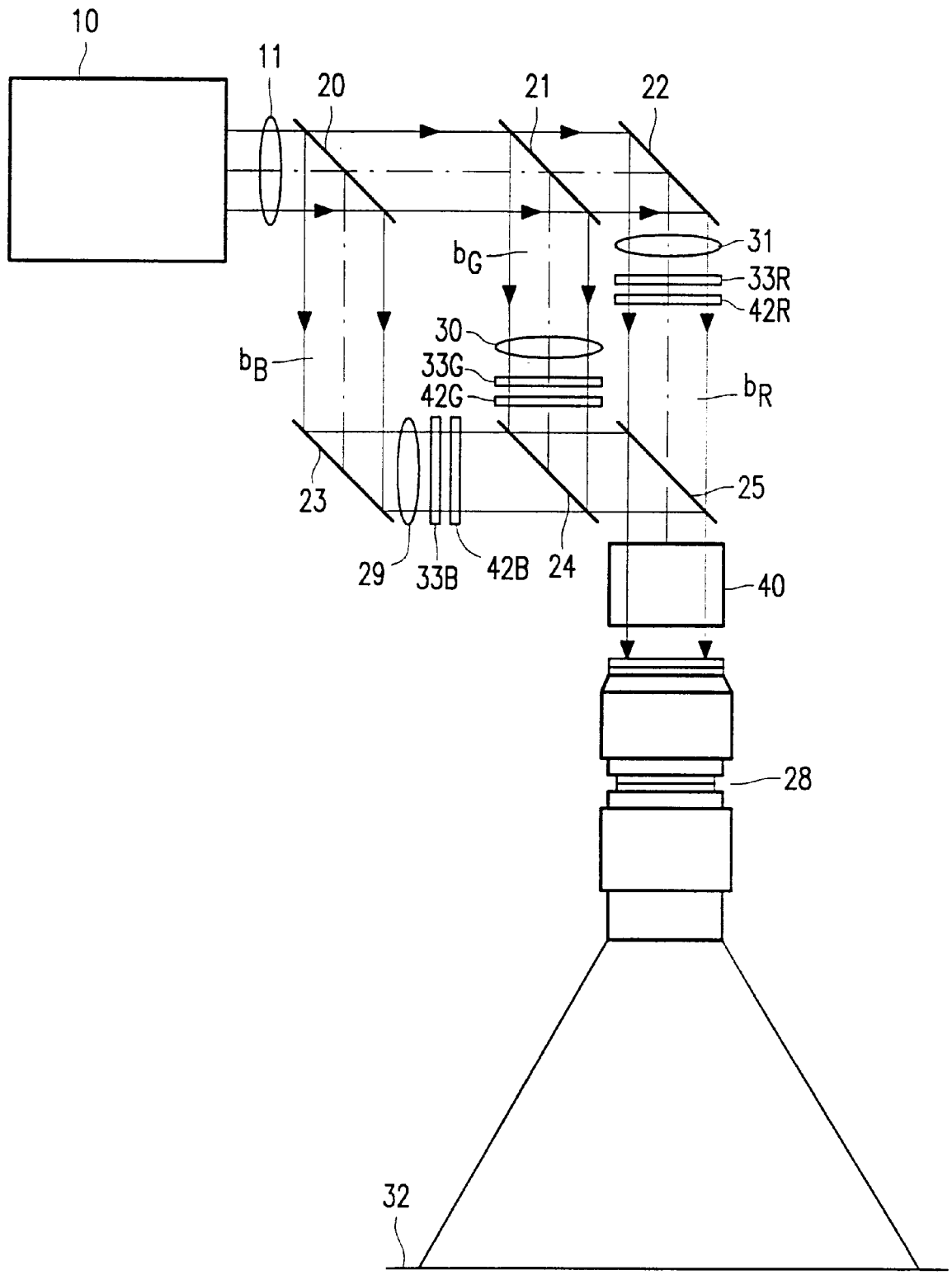
FIG. 1 is a schematic diagram of an embodiment of colour projection apparatus according to the invention.

Referring to FIG. 1, the apparatus comprises an illumination unit 10 providing an output white light projection beam 11. The illumination unit 10 is of conventional form comprising, for example, a light source such as an ultra-high pressure mercury lamp, a reflector arranged on one side of the light source and a condenser lens arranged on the opposite side through which a collimated output beam is obtained. The unit may also comprise integrator plates to produce a beam having substantial uniform intensity and an appropriate cross-section, examples of which are described in U.S. Pat. No. 5,098,184 and U.S. Pat. No. 5,184,248.

The projection beam is divided into primary colour components which are directed by means of a light splitting arrangement to respective transmission image display panels 33R, 33B and 33G, that modulate their respective different colour components. The light splitting arrangement comprises a colour selective reflector 20, for example a dichroic mirror, which reflects the blue colour component $b_B$, of the incident white light beam 11 and passes the rest of the beam. A second colour-selective reflector 21, again, for example, comprising a dichroic mirror, reflects the green colour component $b_G$ and passes the remaining red colour component $b_R$ to a reflector 22 which reflects the red beam component in a direction towards the display panel 33R. The reflector 22 may be a neutral reflector or a reflector which is optimised for red light. The blue beam component $b_B$ is reflected by a neutral or a blue selective reflector 23. Together, the elements 20, 21, 22 and 23 constitute means for splitting the incident projection beam into its three primary colour components and directing these components to respective image display panels.

The blue beam component is reflected $b_B$, by the reflector 23 towards the image display panel 33B. This panel is operated in known manner to modulate the light in accordance with supplied display information so that the blue component of the image to be projected appears on this panel. The beam component modulated with the blue information reaches a projection lens unit 28 via a colour-selective reflector 24, for example a dichroic mirror, which passes the blue beam component and reflects the green beam component, and a further colour-selective reflector 25 e.g. a dichroic mirror, which reflects the blue beam component such that it travels parallel to the optical axis of the projection lens unit. The green beam component $b_G$ is incident on a second image display panel 33G where it is modulated with the green colour component of the image and is then reflected towards the projection lens unit 28 successively by the colour-selective reflectors 24 and 25. The red beam component $b_R$ traverses a third image display panel 33R where it is modulated with the red colour component and subsequently reaches the projection lens unit via the colour-selective reflector 25.

Together, the elements 24 and 25 constitute optical combining means which recombine the individual modulated beams (R, G and B) from the image display panels 33 into a single beam for the lens unit 28. The blue, red and green beam components are superimposed at the input aperture of the lens unit and a colour image is created in a magnified form by the unit 28 on the projection screen 32.

The optical path lengths between the output of the illumination unit 10 and each display panel 33R, 33G and 33B are preferably equal so that the cross-sections of the red, blue and green beam components are equal at the location of their display panel. Also the optical path lengths between the display panels 33R, 33G and 33B and the input aperture of the projection lens unit 28 are substantially equal so that the differently coloured display outputs are satisfactorily superimposed on the projection screen. The lenses 29, 30 and 31 arranged in front of the display panels 33B, 33G and 33R respectively are field lenses which ensure that all light coming from the exit aperture of the illumination unit is concentrated in the entrance pupil of the projection lens unit.

Each image display panel 33 comprises spatial light modulating liquid crystal display panel, preferably a twisted nematic liquid crystalline active matrix panel of the TFT or thin film diode kind. The panel is of conventional form comprising a matrix array of m rows and n columns of pixels (i.e. display elements). Operation of the three display panels 33 is synchronised. The panels 33 are driven according to the red, green and blue information respectively of an applied video signal with the rows of pixels in each panel 33 being driven in conventional manner one at a time in sequence from the first row, row 1, to the last row, row m, such that all rows are driven in a field period $T_f$ corresponding to the field period of the applied video signal. The video signal is of an interlaced type in which odd and even video lines are presented in odd and even field periods respectively. In two successive fields periods, one odd and one even, therefore, the rows of pixels are addressed to display odd and even display lines with each row of pixels displaying firstly an odd line and then an even line. Assuming that the number of pixel rows, m, corresponds to the number of odd, or even, lines in the video signal, then it will be appreciated that the m odd lines and m even lines of the video signal are displayed by the m pixel rows over two field periods, i.e. one frame period.

In a conventional projection apparatus using matrix display panels the number of pixel rows in each display panel should be equal, or close, to the total number of image lines from both fields in the video signal received by the apparatus. However, there are problems with fabricating such panels and achieving a reasonable aperture ratio, particularly if the panels are to be used for displaying a high-definition video signal. To overcome such problems the apparatus of FIG. 1 includes optical deflection means which comprises polarisation switch means and a birefringent element. The birefringent element, referenced 40 in FIG. 1, is situated after the optical combining means and in this embodiment is disposed between the optical combining means 24, 25 and the projection lens unit 28. The polarisation switch means consists of three separate segmented polarisation switch elements, 42R, 42B and 42G, one for each display panel 33, disposed adjacent to the output side of their respective display panel 33 and optically preceding the optical combining means 24, 25.

Figure 2:
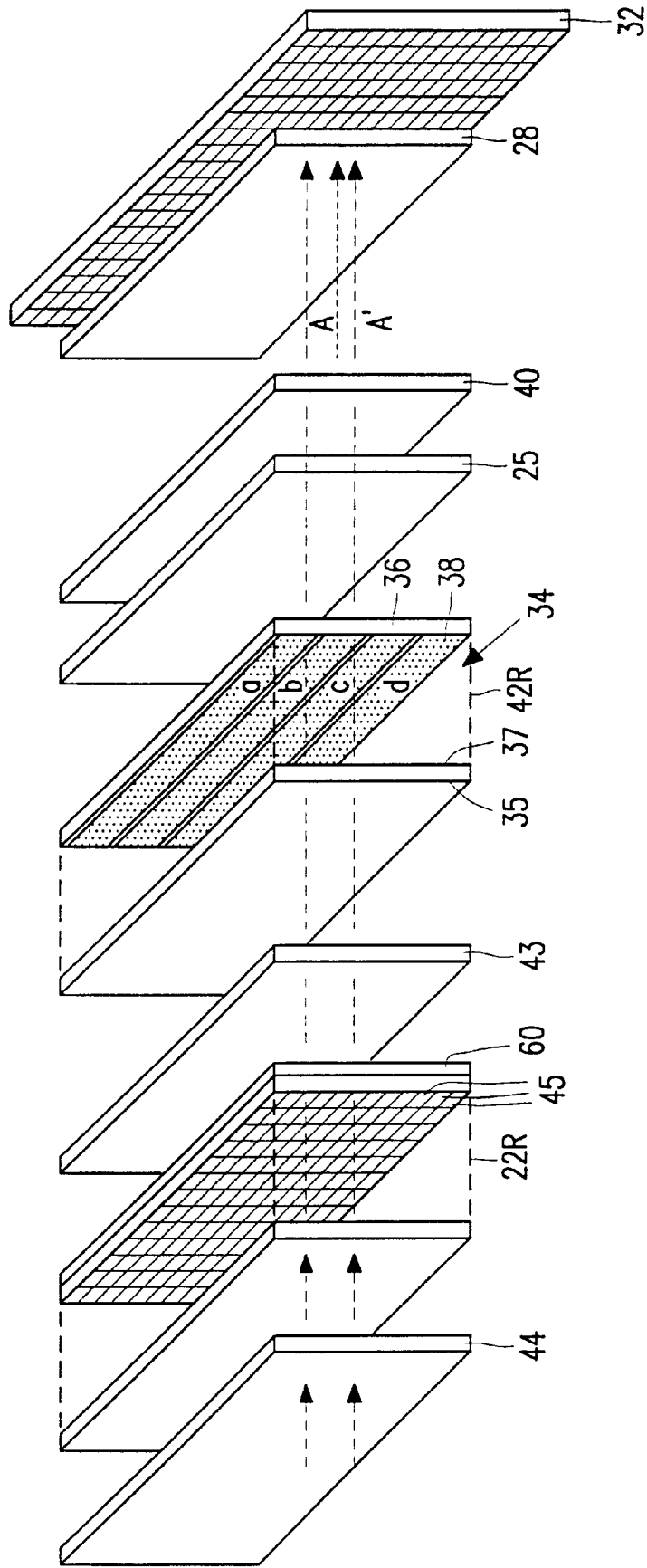
FIG. 2 is a schematic perspective view of the components of part of one colour channel in the projection apparatus.

The operation of the optical deflection means will now be described with regard to one colour channel of the apparatus, it being understood that operation in the other two colour channels is similar. A colour channel, namely the red channel, of the apparatus is shown in greater detail schematically in perspective in FIG. 2. The illumination unit 10 and the elements of the optical splitting means associated with this colour channel have been omitted for simplicity. The direction of the projection light is from left to right. The pixels of the panel 33R, arrayed in rows and columns, are indicated by the rectangular blocks 45, which represent their open apertures, separated by opaque lines. Only a small number of pixels are shown for simplicity. The panel 33R is preceded by a polariser 44 and succeeded by an analyser 43 in conventional fashion. The associated polarisation switch element 42R of the optical deflection means is arranged between the analyser 43 and the selective reflective element 25 while the birefringent element 40, common to all three colour channels, is arranged after the element 25 and before the projection lens unit 28, here shown very schematically. The polarisation switch element 42R, depending on the applied electrical drive signal, either allows light to pass through without alteration to its plane of polarisation or rotates the plane of polarisation of the light passing through it by ninety degrees. The birefringent element 40, depending on the polarisation of the light passing through, either does or does not produce a vertical positional shift. Each segment of the polarisation switch element is associated with the light output from a respective group of adjacent pixel rows. Segmenting the polarisation switch element is necessary bearing in mind the scanning operation of the display panel which means at any one instant certain pixel rows are displaying information from an even field while the remainder are displaying information from an odd field. The polarisation switch element 42R is constituted by a panel comprising a layer 34 of electro-optical material, such as a ferro-electric or a twisted nematic liquid crystalline material, sandwiched between a common transparent electrode 37 and a segmented transparent electrode 38 carried on transparent substrates 35 and 36 respectively. The electrode 38 is divided into a number of strip-electrodes extending parallel to the pixel row direction of the panel 33R which define respective segments. If the light from each pixel row of the display panel were to be individually deflected, a complex electrode structure and a large number of drive circuits would be needed. Therefore it is preferred that the electrode 38 is divided into a small number of strip-electrodes 38a–38d, each of which is aligned with a respective group of adjacent pixel rows of the panel 33, so that the panel 42R comprises a smaller number of horizontal segments, each of which serves to deflect together a number of pixel rows. In the embodiment of FIG. 2 the switch element 42R is shown for simplicity as comprising four horizontal segments, a to d, but the number of segments used in practice would preferably be greater, for example, up to ten, or more. The segment electrodes 38 could be provided on the substrate 35 instead.

Figure 3:
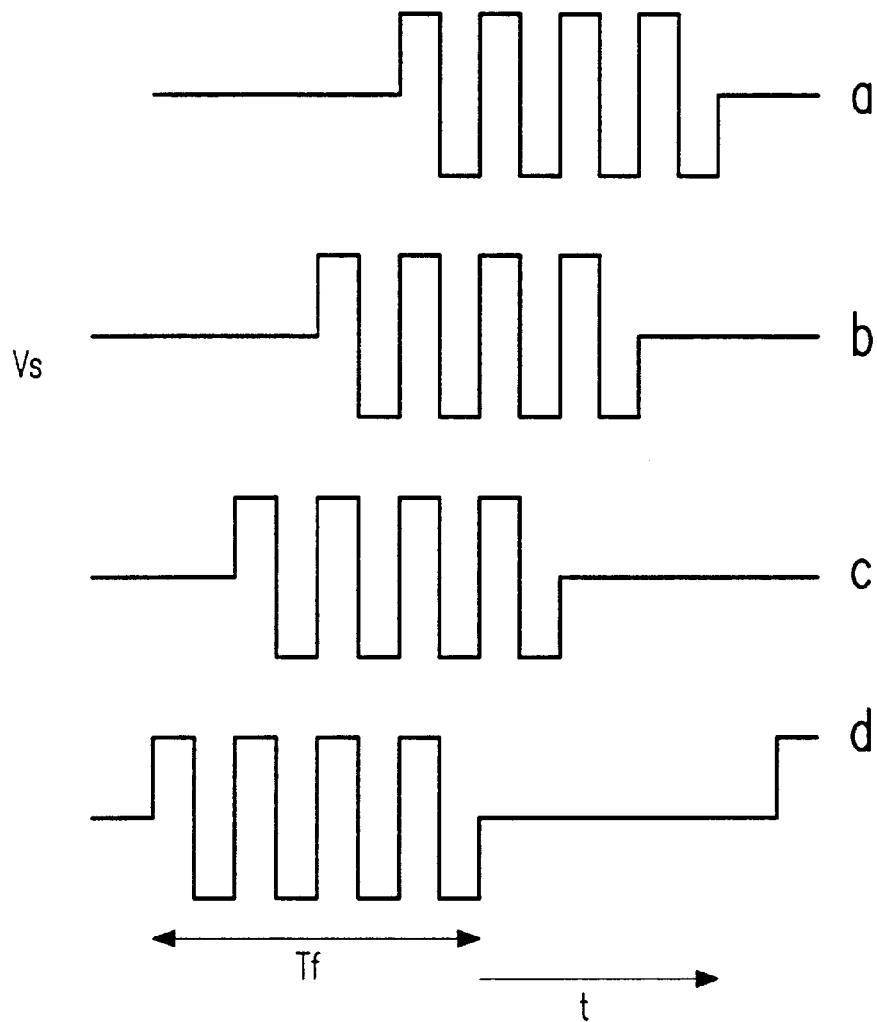
FIG. 3 illustrates typical drive waveforms for driving an electro-optic deflection means used in the projection apparatus.

FIG. 3 shows drive voltage waveforms and relative timings for the four segments, a, b, c and d, of the polarisation switch in the case of T.N. liquid crystal being used. $T_f$, is a field period i.e. half a videoframe period. The segment drive voltages $V_s$, for the succeeding segments a, b, c and d are each shifted by a quarter of the field period relative to the preceding one. The drive voltages consist of short rectangular pulses which are bipolar to eliminate DC voltages and are synchronised with the video signal to be displayed. By applying these voltages to the strip electrodes 38a–38d each of these electrodes is, within each frame time, active during a first time interval and inactive during a second time interval. These first and second time intervals each correspond to the field period and are shifted over a quarter field time for the succeeding segments of the polarisation switch. The result of the operation of the polarisation switch together with the birefringent element is that the light from the pixel rows belonging to a given switch segment, a, b, c or d, is switched by such segment between two positions, as denoted by the lines A and A' in FIG. 2, whereby one of these positions is associated with the even field lines of the displayed image and the other position is associated with the odd field lines. When using a ferro-electric LC material, the polarisation switch element can be driven in the manner shown in the aforementioned paper in Asia Display 1995.

The birefringent element 40 in this embodiment comprises a quartz crystal plate. Alternatively, however, it may comprise at least one birefringent oriented polymer layer. Examples of such birefringent elements are described in U.S. patent application Ser. No. 08/627534. (PHN 15747). In one, simple, example the element comprises a pair of thin, transparent, plates of isotropic material, e.g. glass, defining a wedge shaped space of small angle between them which is filled with a birefringent polymer material aligned such that the optical axis of the material is the same everywhere. This particular form of element provides an angular shift between the two differently polarised beams from the polarisation switch and the element is arranged at an appropriate distance from the display panel to obtain the required transversal shift. In other described forms of the element the angle of the rays is unchanged. A transversal shift which is constant and independent of the axial position of the element is obtained.

In an example of this form of element a central substrate of transparent isotropic material is used whose opposing sides are covered with wedge-shaped oriented polymer layers or with anisotropic, sawtooth-shaped oriented polymer layers. With the transversal shift type of element, the transversal shift between the two differently polarised beams from the polarisation switch 42R provided by the element corresponds to half of the centre-to-centre distance between the pixel rows of the display panel. With the angular shift type of element, a required lateral displacement of pixel rows is obtained by appropriate positioning of the element 40 with respect to the display panel. The lateral displacement is the product of the deflection angle and the effective optical distance between the element 40 and the display panel 33.

By arranging the element 40 in the path of the projection light then for one of the polarisation directions determined by the polarisation switch 42R, the pixel row images formed by the projection lens on the projection screen are displaced relative to the images of the same pixel rows for the other polarisation direction. Seen in the backward direction, from the projection lens to the display panel, the deflection means, on appropriate switching, causes an apparent lateral displacement in the vertical, column, direction of the pixels. The extent of such displacement is selected, by suitable choice of the shift achieved by the birefringent element 40, so that it is approximately half the centre to centre distance between the pixel rows.

Figure 4:
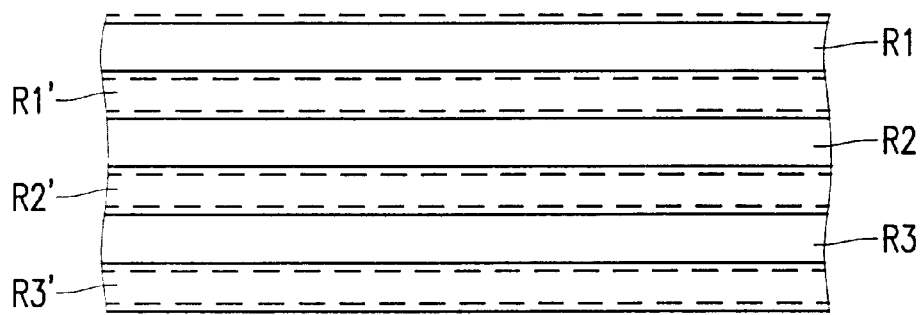
FIG. 4 illustrates schematically the display line structure of the image produced on the projection screen.

FIG. 4 illustrates schematically a typical part of the kind of projected display image structure produced from a few pixel rows belonging to one polarisation switch segment and as would be seen on the projection screen. In this Figure the solid lines represent the apparent positions of projected pixel rows R1, R2 and R3 during a first half frame time (i.e. one field period) and the dotted lines represent the apparent positions of the same projected pixel rows during the second half frame time, here denoted R1', R2'and R3' respectively. When using a standard display panel, however, the row image, for example for an odd line, may not be accommodated between two adjacent row images for even lines and overlap can occur causing imperfect interlace. This results in poor display quality, not least because vertical resolution is severely impaired. Preferably, therefore, an array of lens elements is provided adjacent the input or output side of the display panel 33R, as described in British Patent Application No. 9605056.2 (PHB 34053) whose action is to reduce the apparent height of the image of the pixel rows, constituting display lines, in the projected image display. The height reduction is relative to the centre to centre spacing of the display lines, (pixel row images) in the projected display. The gap between adjacent display lines in one field is correspondingly increased so that the odd display lines fill the gaps between the even display lines without any significant overlap producing neatly arranged interlaced pixel row images. When provided adjacent the output side of the panel 33, the lens array would preferably precede the polarisation switch element 42R. Such a lens element array is shown schematically at 60 in FIG. 2 preceding the analyser 43 but it could be arranged after the analyser.

The polarisation switch elements 42B and 42G of the other two, i.e. blue and green, colour channels operate in a similar manner so that, together with the birefringent element 40, optical interlaced pixel row images from the display panels 33B and 33G constituting display lines are likewise produced on the projection screen 32.

As a result of the disposition of the components of the optical deflection means, improved performance in the projected display is obtained. The light emerging from an LC display panel 33 tends to be diverging, typically with a cone angle of around ±10°. When the polarisation switch elements 40 are positioned sufficiently close to the display panels 33 then it is ensured that all the light from any row of pixels in a panel passes through no more than two adjacent segments of the associated polarisation switch element. For many of the pixel rows, the light output therefrom will pass through just one segment. For the rest of the pixel rows, especially those near the boundaries between adjacent segments, light will pass through two segments. This, however, can in fact be marginally beneficial. If a polarisation switch element were positioned after the combining means then due to this divergence the light from a pixel row would pass through many segments and so some light would be rotated and some unchanged, for a substantial portion of the field period, leading to a loss of performance. Also, when using a birefringent element of the kind which produces an angular shift to the light when its polarisation plane is rotated the position of the birefringent element is determined by the deflection angle for any given row spacing in the LC display panel. Therefore, it is preferable that the polarisation switch element and the birefringent element are positioned apart and not close together as one unit so that each can be in its optimum position. The polarisation switch element 42 is positioned closely adjacent the output side of its respective display panel 33 to optimise performance improvement. To this end, the polarisation switch element 42 is preferably mounted together with its associated display panel 33, including the analyser 43, to form a single, integrated, unit for example by bonding with glue.

In summary, therefore, there has been disclosed a colour image projection apparatus comprising a plurality of image display panels, each operating with light of a different colour, whose outputs are combined by combining means and projected via a lens onto a screen and electro-optical deflection means, comprising a birefringent element following the combining means and preceded by polarisation switch means operable to displace slightly the outputs from rows of pixels in each of the panels in either the odd or even fields so as to produce an interlaced image on the screen, and in which considerably improved performance is achieved by providing a respective, separate, polarisation switch element between each display panel and the combining means, preferably closely adjacent to the output side of the display panel.

It will be appreciated that various modifications to the above-described embodiment are possible. The LC display panels 33 may comprise ferro-electric LC material, polymer dispersed LC material or other types of LC materials. It is envisaged that light modulating display panels using other kinds of electro-optical materials could be used. Also. the components of the beam splitting means and optical combining means and their relative arrangement may be varied from the particular arrangement described, as will be apparent to skilled persons.

From reading the present disclosure, other modifications will be apparent to persons skilled in the art. Such modifications may involve other features which are already known in the field of image projection display apparatus and component parts thereof and which may be used instead of or in addition to features already described herein.

What is claimed is:

1. A colour image projection apparatus comprising illumination means, image display means comprising a plurality of image display panels each illuminated with a different colour light and each having an array of pixels arranged in rows and columns and operable to produce a display output, means for combining the display outputs from the plurality of display panels, a projection lens for projecting the combined outputs on to a projection screen to produce an image, and electro-optical deflection means which is switchable between two modes in which for each panel the light rays from rows of pixels of the display panel and passing through the deflection means either are or are not shifted so as to displace the projected image of the rows of pixels on the projection screen, and which electro-optical deflection means comprises a birefringent element which follows the combining means and segmented polarisation switch means which precedes the birefringent element, characterised in that the polarisation switch means comprises a respective segmented polarisation switch element situated between each display panel and the combining means.

2. A colour image projection apparatus according to claim 1, characterised in that each polarisation switch element is positioned closely adjacent to the output side of its respective image display panel.

3. A colour image projection apparatus according to claim 2, characterised in that each image display panel and its respective polarisation switch element are mounted together and comprise a single unit.

4. A colour image projection apparatus according to claim 3, characterised in that each polarisation switch element is bonded to the output side of its respective image display panel.

5. A colour image projection apparatus according to claim 4, characterised in that the polarisation switch elements comprise segmented liquid crystal devices.

6. A colour image projection apparatus according to claim 5, characterised in that the image display panels comprise liquid crystal image display panels.

* * * * *